Dec. 24, 1940.  C. PFANSTIEHL  2,226,322
RETARDED WELDING DEVICE
Filed Oct. 13, 1939

Inventor:
Carl Pfanstiehl.
By Chritton, Wiles, Davis, Hirsch & Dawson
Attys.

Patented Dec. 24, 1940

2,226,322

UNITED STATES PATENT OFFICE 2,226,322

RETARDED WELDING DEVICE

Carl Pfanstiehl, Highland Park, Ill., assignor to Pfanstiehl Chemical Company, a corporation of Illinois Application October 13, 1939, Serial No. 299,357

3 Claims. (Cl. 219—4)

This invention relates to a retarded welding device and more particularly one in which small tips are welded to bases such as pen nibs or phonograph needles and in which the duration of the welding current is controlled by relative movement of the tip and base toward each other under a fixed pressure.

A system of this type is shown in my Patents Nos. 2,005,752, issued June 25, 1935; 2,032,887, issued March 3, 1936; and 2,145,274, issued January 31, 1939, and a specific embodiment thereof is shown in the patent of Bruce Chandler, No. 2,167,925, issued August 1, 1939.

In such devices, even where the pressure tending to move the base toward the tip is only gravitational and the weight is made as small as possible, there is a tendency for the fusion to occur for such a short period only, that the tip, particularly a very high melting-point tip, is not sufficiently heated to provide maximum adhesion.

Numerous methods have been investigated for circumventing this difficulty. Ordinary methods of delaying the movement of the base failed either because too much inertia was provided, because the movement was made non-uniform, or else because the delay did not become effective in the short period of time and under the slow conditions of motion which accompany the welding process.

It has now been discovered that the process may be satisfactorily delayed by the provision of a liquid filled dash pot.

Figure 1:
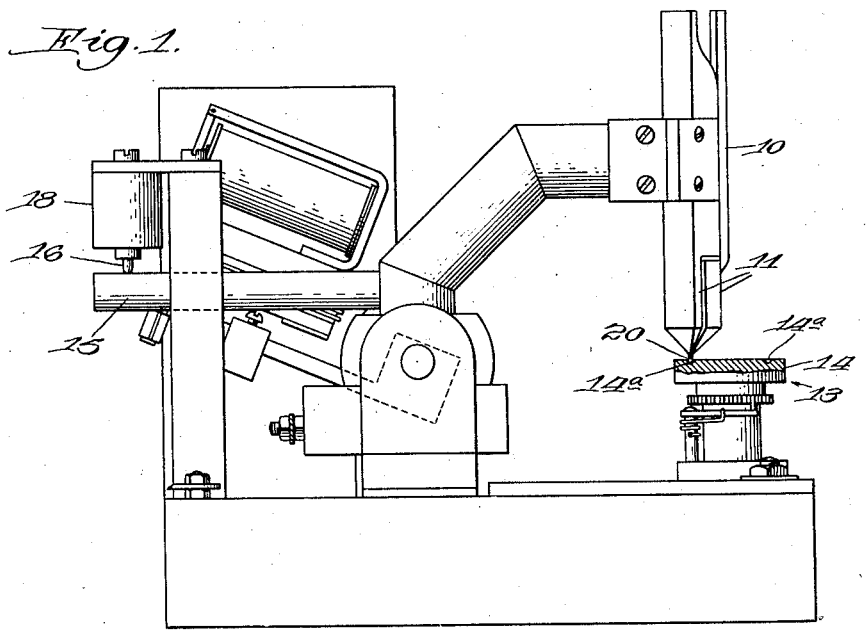
Figure 2:
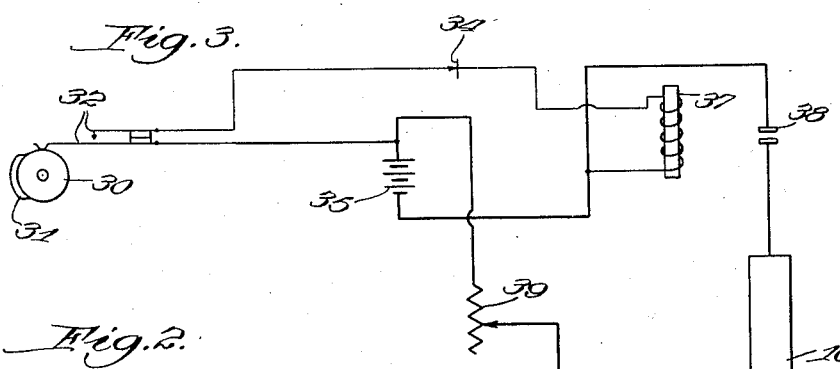

The invention is diagrammatically illustrated in the drawing in which Fig. 1 is a side elevation of a portion of a tip welding apparatus such as that shown in Chandler Patent 2,167,925 as modified by the provision of a dash pot device; Fig. 2 is a detailed view, partly in section, of the dash pot; and Fig. 3 is a wiring digram.

As shown in the drawing, the welding mechanism may comprise a pivotally mounted base holder 10 provided with jaws 11 within which a base 12 (Fig. 3) may be supported. The tip holder 13 supplies tips in any suitable manner, for example by a rotating table 14 provided with a plurality of indentations 14a. An arm 15 is secured to the base holder and contacts near its end a plunger 16 which is connected to the piston 17 in the dash pot container 18. The container 18 is provided with a liquid 19 which is preferably a light non-viscous oil such as ordinary light machine oil. Sufficient clearance is left between the piston 17 and the inner walls of the container 18 so that the cylinder moves quite freely.

In the arrangement shown, the jaws 11 are somewhat weighted in order to increase the positiveness of action of the device. For example, whereas formerly the weight pressing upon the tip 20 (Fig. 3) would be in the neighborhood of from 25–50 grams, this is purposely increased to, say, 100–200 grams for tips which have a diameter of .025–.040 of an inch.

Figure 3:
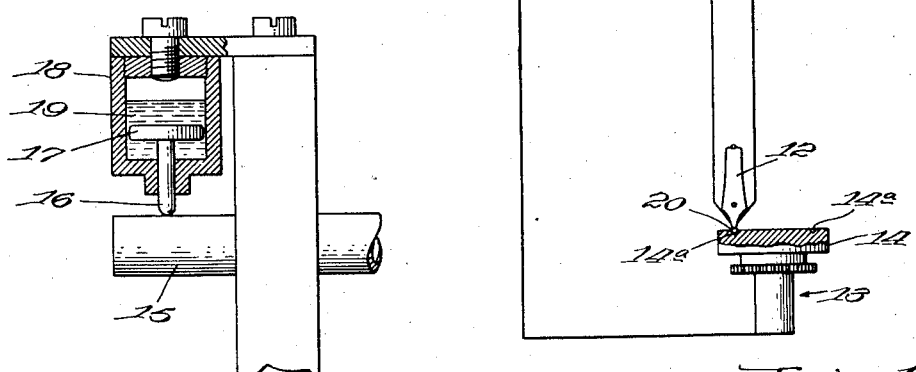

A suitable wiring diagram is illustrated in Fig. 3 in which 30 represents a suitably driven contactor which initiates the current when the cam 31 forces the contacts 32 into engagement. The size of the cam 31 is adjusted so that the welding cycle is maintained for a longer period than is necessary to complete the weld. The closing of the contacts 32 causes the current from the 4 to 6 volt battery 35 to flow through the relay 37 whenever the cut-off contacts 34 are in contact. The operation of the cut-off device is thoroughly explained in my aforesaid patents. The cut-off is adjusted so that when the holder 10 has dropped a predetermined distance the contact will be broken.

The relay 37 causes the heavy current contactors 38 to engage, thereby completing the welding circuit and permitting the welding current of approximately 120 amperes to flow. For ordinary purposes a resistor 39 is adjusted in the welding circuit to produce a voltage of roughly .7 volt across the weld during and after completion thereof. Ordinarily about .05 ohm is required for this purpose.

The operation of the device is extremely simple. A tip 20 is placed in position beneath the holder 10 and a nib 12 is then inserted in the jaws 11. The holder is then brought down so that the nib rests upon the tip 20 after which the operator starts the motor contactor. Once the welding cycle is started some of the nib metal fuses, thereby leaving the holder free to drop. The action of the dash pot, however, reduces the speed of the drop to such an extent that the welding current continues to pass for about twice as long as would be the case without the dash pot. Ordinarily with objects the size of those here described the weld would require approximately 1/40 of a second, whereas with the dash pot arrangement this is increased to approximately 1/20 of a second. This slight difference permits the tip to become considerably warmer during the process as a result of which the weld is improved in appearance and firmness. Apparently, also, the slow steady movement of the base under the effect of the dash pot appears to produce an intermediate zone of thoroughly molten metal, instead of a plastic semi-solid mass, and as a result the tip becomes hotter and is better wetted by the more fluid mass. The slower movement also avoids squashing out of metal, which not only would spoil the appearance of the weld but would produce a thinner zone of welding metal between the tip and the unmelted portion of the base.

What I claim as new, and desire to secure by Letters Patent, is:

1. In the electric welding of a minute very high melting point tip to a base of relatively low melting point, in which welding operation the duration of the welding circuit depends upon the rate of approach of the tip and base and the members supporting them under light pressure upon fusion of contacting metal; the step of uniformly retarding the rate of approach of the tip and base by passing a portion of one of the supporting members through a liquid friction member.

2. Apparatus for welding high melting point minute tips to bases of relatively low melting point which comprises means for supporting such a tip and means for movably mounting such a base above the tip whereby the base rests lightly upon the tip under the influence of gravity, means for passing an electric welding current through tip and base, means for cutting off the welding current upon fall of the base a predetermined distance, and a liquid filled dash pot connected with the base mounting means for uniformly retarding the rate of fall thereof.

3. Apparatus for welding small high melting point tips to bases of relatively low melting point which comprises means for supporting such a tip, means for supporting a base, the two supporting means being placed one above the other and adapted to rest one of the objects to be welded lightly upon the other under the influence of gravity, means for passing a welding current through tip and base, means for cutting off the welding current upon fall of the upper member a predetermined distance, and a liquid filled dash pot connected with the upper supporting means for uniformly retarding the rate of fall thereof.

CARL PFANSTIEHL.